(12) United States Patent
Sun

(10) Patent No.: US 6,604,987 B1
(45) Date of Patent: Aug. 12, 2003

(54) CMP COMPOSITIONS CONTAINING SILVER SALTS

(75) Inventor: Tao Sun, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 10/164,825

(22) Filed: Jun. 6, 2002

(51) Int. Cl.⁷ .................................................. B24B 1/00
(52) U.S. Cl. ........................... 451/41; 451/60; 451/285; 451/286; 451/287; 451/288
(58) Field of Search ............................. 451/41, 60, 285, 451/286, 287, 288

(56) References Cited

U.S. PATENT DOCUMENTS

| | | |
|---|---|---|
| 4,769,046 A | 9/1988 | Senda et al. |
| 5,225,034 A | 7/1993 | Yu et al. |
| 5,489,233 A | 2/1996 | Cook et al. |
| 5,527,423 A | 6/1996 | Neville et al. |
| 5,795,828 A * | 8/1998 | Endo et al. ................. 438/678 |
| 5,958,794 A | 9/1999 | Bruxvoort et al. |
| 6,015,506 A * | 1/2000 | Streinz et al. ........... 252/186.1 |
| 6,062,968 A | 5/2000 | Sevilla et al. |
| 6,117,000 A | 9/2000 | Anjur et al. |
| 6,190,237 B1 | 2/2001 | Huynh et al. |
| 6,299,795 B1 | 10/2001 | Liu et al. |
| 2002/0004360 A1 | 1/2002 | Ota et al. |
| 2002/0017063 A1 | 2/2002 | Beitel et al. |

FOREIGN PATENT DOCUMENTS

| | | |
|---|---|---|
| EP | 1 118 647 A1 | 7/2001 |
| WO | WO 98/23697 A1 | 6/1998 |
| WO | WO 99/53532 A1 | 10/1999 |
| WO | WO 02/20214 A2 | 3/2002 |

* cited by examiner

*Primary Examiner*—George Nguyen
*Assistant Examiner*—Shantese McDonald

(57) ABSTRACT

The invention provides a method of polishing a nickel-containing substrate comprising (i) contacting the substrate with a chemical-mechanical polishing system comprising an abrasive, a polishing pad, or both an abrasive and a polishing pad, a silver salt comprising a silver ion, and a liquid carrier, and (ii) abrading at least a portion of the substrate to polish the substrate. The invention further provides a chemical-mechanical polishing system comprising (a) an abrasive, a polishing pad, or both an abrasive and a polishing pad, (b) a liquid carrier, (c) a silver salt comprising a silver ion, and (d) a secondary oxidizing agent, wherein the amount of the silver ion is about 0.1 wt. % to about 3 wt. % and the wt. % amount of the secondary oxidizing agent is about 3 times or less than the wt. % amount of the silver ion, based on the weight of the liquid carrier and anything dissolved or suspended therein.

28 Claims, 1 Drawing Sheet

CMP COMPOSITIONS CONTAINING SILVER SALTS

FIELD OF THE INVENTION

This invention pertains to chemical-mechanical polishing compositions containing silver salts and their use to polish nickel-containing substrates.

BACKGROUND OF THE INVENTION

Compositions and methods for planarizing or polishing the surface of a substrate are well known in the art. Polishing compositions (also known as polishing slurries) typically contain an abrasive material in an aqueous solution and are applied to a surface by contacting the surface with a polishing pad saturated with the polishing composition. Typical abrasive materials include silicon dioxide, cerium oxide, aluminum oxide, zirconium oxide, and tin oxide. U.S. Pat. No. 5,527,423, for example, describes a method for chemically-mechanically polishing a metal layer by contacting the surface with a polishing slurry comprising high purity fine metal oxide particles in an aqueous medium. The polishing slurry is typically used in conjunction with a polishing pad (e.g., polishing cloth or disk). Suitable polishing pads are described in U.S. Pat. Nos. 6,062,968, 6,117,000, and 6,126,532, which disclose the use of sintered polyurethane polishing pads having an open-celled porous network, and U.S. Pat. No. 5,489,233, which discloses the use of solid polishing pads having a surface texture or pattern. Alternatively, the abrasive material may be incorporated into the polishing pad. U.S. Pat. No. 5,958,794 discloses a fixed abrasive polishing pad.

Conventional polishing systems and polishing methods typically are not entirely satisfactory at planarizing substrates, especially memory disks. In particular, such polishing systems and polishing methods can result in less than desirable polishing rates and high surface defectivity when applied to memory or rigid disks. Because the performance of many substrates, such as memory disks, is directly associated with the planarity of its surface, it is crucial to use a polishing system and method that results in a high polishing efficiency, selectivity, uniformity, and removal rate and leaves a high quality polish with minimal surface defects.

There have been many attempts to improve the removal rate of memory or rigid disks during polishing, while minimizing defectivity of the polished surface during polishing. For example, U.S. Pat. No. 4,769,046 discloses a method for polishing a nickel-plated layer on a rigid disk using a composition comprising alumina abrasive and a polishing accelerator such as nickel nitrate, aluminum nitrate, or mixtures thereof. U.S. Pat. No. 6,015,506 discloses a method for polishing rigid disks using a polishing composition comprising a dispersion of a metal oxide abrasive, an oxidizing agent, and a catalyst having multiple oxidation states. WO 02/20214 discloses a method for polishing memory or rigid disk substrates using a polishing composition comprising an oxidized halide and an amino acid.

The use of oxidizing silver salts to increase the polishing removal rate of a substrate layer is commonly known in the art. For example, U.S. Pat. No. 5,225,034 discloses a method of polishing copper-containing substrates using a polishing composition comprising water, abrasive, an oxidizing component selected from the group consisting of nitric acid, sulfuric acid, and silver nitrate, or mixtures thereof, and optionally a second oxidant (e.g., $H_2O_2$, HOCl, KOCl, $KMnO_4$, $CH_3COOH$). The '034 patent discloses that the amount of the oxidizing component is about 2% to 15% based on the volume of the polishing composition. U.S. Pat. No. 6,190,237 discloses a polishing composition optionally comprising a chemical etchant (e.g., ferric nitrate, potassium iodate, ammonium cerium nitrate, potassium ferricyanide, hydrogen peroxide, and silver nitrate). U.S. Published Application 2002/0017063 A1 discloses a polishing composition for polishing noble metal substrate comprising water, polycrystalline diamond powder, and at least one additive selected from the group consisting of oxidizing agents (e.g., $AgNO_3$, $Na_2S_2O_8$, and combinations thereof), complex-forming agents, surfactants, and organic bases. U.S. Published Application 2002/0004360 A1 discloses a polishing composition comprising inorganic compounds (e.g., Ag compounds) or organic compounds as abrasive grains.

A need remains, however, for polishing systems and polishing methods that will exhibit desirable planarization efficiency, selectivity, uniformity, and removal rate during the polishing and planarization of substrates, especially memory disks, while minimizing defectivity, such as surface imperfections and damage to underlying structures and topography during polishing and planarization.

The invention seeks to provide such a chemical-mechanical polishing system and method. These and other advantages of the invention will be apparent from the description of the invention provided herein.

BRIEF SUMMARY OF THE INVENTION

The invention provides a method of polishing a nickel-containing substrate comprising (i) contacting the substrate with a chemical-mechanical polishing system comprising an abrasive, a polishing pad, or both an abrasive and a polishing pad, a silver salt comprising a silver ion, and a liquid carrier, and (ii) abrading at least a portion of the substrate to polish the substrate. The invention further provides a chemical-mechanical polishing system comprising (a) an abrasive, a polishing pad, or both an abrasive and a polishing pad, (b) a liquid carrier, (c) a silver salt comprising a silver ion, and (d) a secondary oxidizing agent, wherein the amount of the silver ion is about 0.1 wt. % to about 3 wt. % and the wt. % amount of the secondary oxidizing agent is about 3 times or less than the wt. % amount of the silver ion, based on the weight of the liquid carrier and anything dissolved or suspended therein.

DETAILED DESCRIPTION OF THE INVENTION

Figure 1:
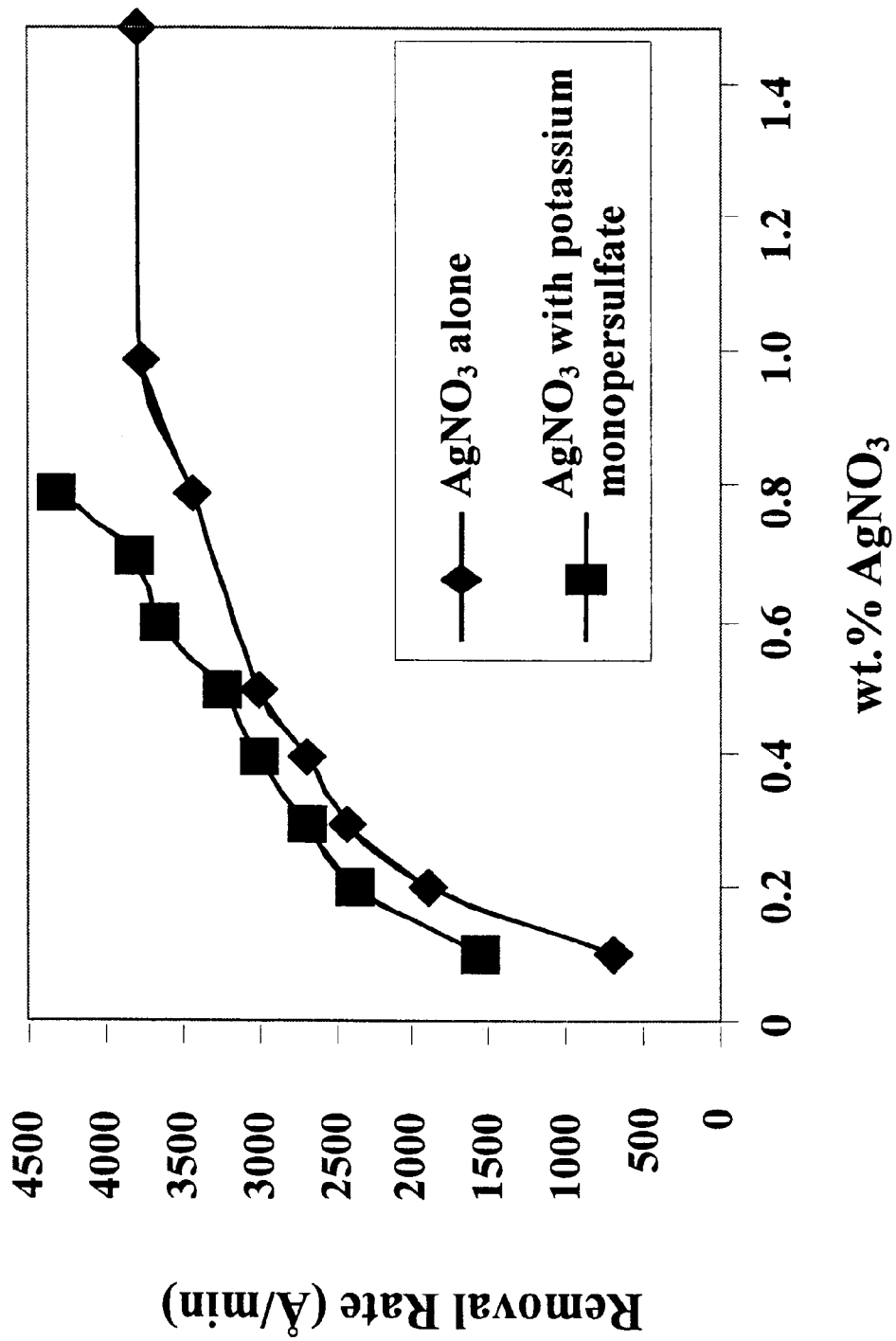
FIG. 1 is a plot of silver nitrate concentration versus removal rate comparing a polishing compositions containing silver nitrate alone to a polishing composition containing silver nitrate in combination with potassium monopersulfate.

The invention is directed to a chemical-mechanical polishing system comprising an abrasive, a polishing pad, or both an abrasive and a polishing pad, a silver salt comprising a silver ion, and a liquid carrier. The invention also is directed to a method of polishing a substrate. The method comprises (i) contacting the substrate with a chemical-mechanical polishing system comprising an abrasive, a polishing pad, or both an abrasive and a polishing pad, a silver salt comprising a silver ion, and a liquid carrier, and (ii) abrading at least a portion of the substrate to polish the substrate.

The chemical-mechanical polishing (CMP) system described herein comprises an abrasive, a polishing pad, or both. Preferably, the CMP system comprises both an abrasive and a polishing pad. The abrasive can be in any suitable form (e.g., abrasive particles). The abrasive can be fixed on the polishing pad and/or can be in particulate form and suspended in the liquid carrier. The polishing pad can be any suitable polishing pad. The abrasive (when present and suspended in the liquid carrier) and the silver salt, as well as any other components suspended in the liquid carrier, form the polishing composition of the CMP system.

The abrasive can be any suitable abrasive (e.g., a metal oxide). For example, the abrasive can be a metal oxide abrasive selected from the group consisting of alumina, silica, titania, ceria, zirconia, germania, magnesia, co-formed products thereof, and combinations thereof, or can comprise silicon nitride, silicon carbide, diamond, and the like. The abrasive also can be a polymer particle or a coated particle. Typically, the abrasive is selected from the group consisting of alumina, silica, co-formed products thereof, coated metal oxide particles, polymer particles, and combinations thereof. Preferably, the abrasive is silica (e.g., colloidal silica). The polishing system typically comprises about 0.1 wt. % to about 20 wt. % (e.g., about 0.5 wt. % to about 15 wt. %, or about 1 wt. % to about 10 wt. %) abrasive, based on the weight of the liquid carrier and any compounds dissolved or suspended therein.

The silver salt can be any suitable silver salt. Typically, the silver salt is selected from the group consisting of silver halides, silver sulfate, silver nitrate, silver carbonate, silver acetate, silver perchlorate, silver dichromate, silver oxide, and combinations thereof. Preferably, the silver salt is silver nitrate. The silver salt comprises a silver ion. The amount of the silver ion used in the polishing composition preferably is about 3 wt. % or less (e.g., about 2 wt. % or less), based on the weight of the liquid carrier and anything dissolved or suspended therein. The use of an amount of silver ion greater than about 3 wt. % can lead to problems with colloidal stability of the abrasive. Typically, the amount of silver ion is about 0.1 wt. % or more (e.g., about 0.5 wt. % or more, or even 1 wt. % or more). The silver ion is not intended to act as a catalyst and should be present in more than merely a catalytic amount. Preferably, the amount of the silver ion is about 0.1 wt. % to about 3 wt. % (e.g., about 0.5 wt. % to about 2 wt. %), based on the weight of the liquid carrier and anything dissolved or suspended therein.

A liquid carrier is used to facilitate the application of the abrasive (when present and suspended in the liquid carrier), silver salt, and any optional additives to the surface of a suitable substrate to be polished (e.g., planarized). The liquid carrier is typically an aqueous carrier and can be water alone, can comprise water and a suitable water-miscible solvent, or can be an emulsion. Suitable water-miscible solvents include alcohols such as methanol, ethanol, etc. Preferably, the aqueous carrier consists of water, more preferably deionized water.

The polishing system described herein is used in a method of polishing (e.g., planarizing) a substrate. The substrate can be any suitable substrate. For example, the substrate can be a semiconductor substrate. Typically, the substrate is a substrate that retains information in electromagnetic form (e.g., a memory disk, a hard disk, or a rigid disk) or is a microelectromechanical system (MEMS) substrate. Preferably, the substrate is a nickel-containing substrate, e.g., a substrate comprising a metal layer comprising nickel. More preferably, the substrate is a memory or rigid disk, for example, a memory disk comprising nickel phosphorus.

The polishing composition can have any suitable pH. For example, the polishing composition can have a pH of about 1 to about 12 (e.g., about 2 to about 9). The actual pH of the polishing composition will depend, in part, on the type of substrate being polished. When the substrate is a memory disk, the polishing composition typically has a pH of about 5 or less (e.g., about 4 or less) and a pH of about 1 or greater (e.g., about 1.5 or greater).

In some CMP applications, it may be desirable for the polishing composition to optionally further comprise a secondary oxidizing agent. The secondary oxidizing agent can be any suitable oxidizing agent. Suitable oxidizing agents include inorganic and organic per-compounds, bromates, nitrates, chlorates, chromates, iodates, iron and copper salts (e.g., nitrates, sulfates, EDTA, and citrates), rare earth and transition metal oxides (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. Preferably, the secondary oxidizing agent is a peroxide, a monopersulfate, a perborate, or a persulfate, more preferably, hydrogen peroxide, potassium monopersulfate (also known as postassium peroxymonosulfate and available as Oxone® oxidizing agent from DuPont with a reported chemical formula of $2KHSO_5 \cdot KHSO_4 \cdot K_2SO_4$ (FW 614.78)), ammonium persulfate, or sodium borate.

If present in the polishing composition, the amount of the secondary oxidizer should not substantially exceed the amount of the silver salt. Typically, the wt. % amount of the secondary oxidizer is about three times or less the wt. % amount of the silver salt, preferably about two times or less than wt. % the amount of the silver salt. For example, when the amount of silver salt is about 0.1 wt. % to about 2 wt. % based on the liquid carrier and any components dissolved or suspended therein, the amount of the secondary oxidizing agent is about 6 wt. % or less, preferably 4 wt. % or less, or more preferably 2 wt. % or less based on the liquid carrier and any components dissolved or suspended therein.

In other CMP applications, it may not be necessary for the silver salt to be used in combination with a secondary oxidizer in order to obtain a significant polishing benefit. Thus, in this embodiment, the polishing composition does not contain a substantial amount of a secondary oxidizing agent. By the term "substantial amount" is meant that the amount of any secondary oxidizer is less than the amount of the silver salt. Preferably, in this embodiment, the wt. % amount of any secondary oxidizer present in the polishing composition is less than about 10% of the wt. % amount of the silver salt, or even less than about 5% of the wt. % amount of the silver salt.

The polishing composition can contain other components or additives. An additive, which may be particularly useful with this invention, is one that stabilizes the secondary oxidizer (if present in the polishing system) in the presence of the silver salt. It is well known that peroxy-type oxidizers like hydrogen peroxide are not stable in the presence of many metal ions without the use of stabilizers. For this reason, the polishing composition may include a stabilizer to prevent degradation of the peroxy-type oxidizer over time. The addition of a stabilizer to the polishing composition reduces the effectiveness of the metal compound; therefore, the choice of the type and amount of stabilizer is important to CMP performance.

Useful stabilizers include phosphoric acid, organic acids (e.g., carboxylic acids and dicarboxylic acids), phosphonic acids, nitriles, and other ligands, which bind to the silver ion and reduce its reactivity toward peroxy-type oxidizers. The acid stabilizers can be used in their conjugate base form (e.g., carboxylates, phosphates, and phosphonates). Stabilizers can be used singly or in combination and significantly decrease the rate at which peroxy-type oxidizers decompose. Preferred stabilizers include phosphoric acid, phthalic acid, citric acid, adipic acid, oxalic acid, malonic acid, benzonitrile, conjugate bases thereof, and mixtures thereof. Suitable phosphonic acids include aminotrimethylenephosphonic acid, 1-hydroxyethylidene-4-diphosphonic acid, hexamethylenediaminetetramethylene phosphonic acid, and diethylenetetramine pentamethylenephosphonic acid. A preferred phosphonic acid stabilizer is aminotrimethylene phosphonic acid. The amount of stabilizer present in the polishing composition desirably is about one equivalent or more per silver ion. Preferably, the amount of stabilizer is about 5 wt. % or less (more preferably, about 3 wt. % or less) based on the liquid carrier and any components dissolved or suspended therein.

The polishing system, particularly the polishing composition, optionally can further comprise a chelating or complexing agent. The complexing agent is any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like), halides (i.e., fluorides, chlorides, bromides, and iodides), amine-containing compounds (e.g., ammonia, amino acids, amino alcohols, di-, tri-, and polyamines, and the like), sulfur-containing compounds (e.g., thiols, thioesters, thioethers, and sulfates), and the like.

The chelating or complexing agent also can be an amino acid. Amino acids are generally useful for decreasing defectivity of the substrate surface during polishing. The amino acid can be any suitable amino acid. Suitable amino acids include, for example, amino acids containing 1–8 carbon atoms (e.g., 1–7 carbon atoms, or 1–6 carbon atoms). Preferably, the amino acid is selected from the group consisting of glycine, iminodiacetic acid, alanine, valine, leucine, isoleucine, serine, and threonine. More preferably, the amino acid is glycine or alanine. Any suitable amount of the amino acid can be present in the polishing composition. The amino acid desirably is present in an amount of about 0.01 to about 10 wt. % (e.g., about 0.1 to about 8 wt. %, or about 0.5 to about 5 wt. %) based on the liquid carrier and any components dissolved or suspended therein.

The chelating or complexing agent also can be a phosphate or phosphonate ion. Phosphate ions are defined by the chemical structure $PO_4$, wherein the structure comprises a double bond (P=O) and phosphonate ions are defined by the chemical structures $RO-PO_3$ or $R_2O_2-PO_2$, wherein the structures comprise a double bond (P=O), and wherein R is an organic moiety, typically, an organic moiety selected from the group consisting of an alkyl moiety, an aryl moiety, a cyclic moiety, an aromatic moiety, and a heteroatom-containing organic moiety (e.g., an N-containing organic moiety). The phosphate ion can be derived from any suitable source of phosphate ion. Suitable sources of phosphate ion include, for example, phosphoric acids and water-soluble phosphates, e.g., orthophosphates, polyphosphates, and mixtures thereof. The source of phosphate ion also can be selected from the group consisting of pyrophosphates, tripolyphosphates, and mixtures thereof. Preferably, the source of phosphate ion is selected from the group consisting of a sodium phosphate, a potassium phosphate, a lithium phosphate, a cesium phosphate, a magnesium phosphate, an ammonium phosphate, phosphoric acid, and the like, and mixtures thereof. The phosphonate ion can be derived from any suitable source of phosphonate ion. Suitable sources of phosphonate ion include, for example, amine-containing phosphonates, imine-containing phosphonates, imide-containing phosphonates, amide-containing phosphonates, phosphonate compounds containing no nitrogen (e.g., phosphonates containing no amine groups), and mixtures thereof. Preferably, the source of phosphonate ion is selected from the group consisting of phosphoacetic acid, 2-aminoethyl dihydrogen phosphate, aminotri(methylenephosphonic acid), nitrilotris(methylene)triphosphonic acid, 1-hydroxyethylidene-1-diphosphonic acid, and diethylenetriaminepenta(methylenephosphonic acid), and mixtures thereof.

Any suitable amount of the phosphate ion or phosphonate ion can be present in the polishing system, and particularly in the polishing composition. It is suitable, for example, for the phosphate ion or phosphonate ion to be present in a concentration of about 0.01 M or higher (e.g., about 0.05 M or higher, or about 0.1 M or higher). Generally, the phosphate ion or phosphonate ion is present in the polishing composition in a concentration that does not exceed about 1 M, preferably a concentration that does not exceed about 0.75 M, e.g., about 0.5 M or less.

It will be appreciated that many of the aforementioned compounds can exist in the form of a salt (e.g., a metal salt, an ammonium salt, or the like), acid, or as a partial salt. For example, citrates include citric acid, as well as mono-, di-, and tri-salts thereof, phthalates include phthalic acid, as well as mono-salts (e.g., potassium hydrogen phthalate) and di-salts thereof, perchlorates include the corresponding acid (i.e., perchloric acid), as well as salts thereof. Furthermore, certain compounds can perform more than one function. For example, some compounds can function both as an oxidizing agent and a chelating agent (e.g., ammonium persulfate, hydroxylamine nitrate, and the like). In addition, the polishing composition of the invention can comprise two or more chemical accelerators, e.g., three or more chemical accelerators, or even four or more chemical accelerators. In this regard, the chemical accelerators can function in a manner as to bring about an enhanced or even a synergistic effect. For example, the polishing composition of the invention can comprise an oxidizing agent and a complexing agent.

The polishing system, particularly the polishing composition, optionally further comprises one or more other additives. Such additives include surfactants (e.g., cationic surfactants, anionic surfactants, nonionic surfactants, amphoteric surfactants, fluorinated surfactants, and mixtures thereof), polymeric stabilizers or other surface active dispersing agents (e.g., organic acids, tin oxides, and phosphonate compounds), and additional polishing accelerators such as catalysts and chelating or complexing agents. The polishing system optionally can further comprise one or more components such as pH adjusters, regulators, or buffers, and the like. Suitable pH adjusters, regulators, or buffers can include, for example, sodium hydroxide, sodium carbonate, sulfuric acid, hydrochloric acid, nitric acid, phosphoric acid, citric acid, potassium phosphate, mixtures thereof, and the like.

The surface of a substrate, especially the surface of a memory or rigid disk, can be planarized or polished with the polishing system with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, and coformed products thereof, and mixtures thereof. As discussed above, the abrasive of the polishing system can be fixed (e.g., embedded) in whole or in part, in or on the polishing pad such fixation on the polishing pad can be accomplished, for example, by blending the abrasive material, e.g., abrasive particles, into the aforementioned polymers during the formation of the polishing pad.

The viscosity of the polishing system can be adjusted by altering the concentrations of the particular components of the polishing system. The viscosity of the polishing system also can be adjusted through the addition to the polishing system of any suitable rheological control agent (i.e., a polymeric Theological control agent). Suitable rheological control agents include, for example, urethane polymers (e.g., urethane polymers with a molecular weight greater than about 100,000 Daltons), and acrylates comprising one or more acrylic subunits (e.g., vinyl acrylates and styrene acrylates), and polymers, copolymers, and oligomers thereof, and salts thereof.

The following examples further illustrate the invention but, of course, should not be construed as in any way limiting its scope.

EXAMPLE 1

This example demonstrates that silver salts produce superior polishing removal rates for memory disk substrates compared to other metal oxidants.

Similar memory disk substrates comprising nickel phosphorous were polished with different polishing compositions (Polishing Compositions 1A–1D). Each polishing composition comprised 4 wt. % colloidal silica and 0.5 wt. % potassium monopersulfate (Oxone® oxidizing agent, DuPont) at a pH of approximately 2.5. Polishing Composition 1A (invention) further comprised 0.1 wt. % or 0.2 wt. % $AgNO_3$. Polishing Compositions 1B–1D (comparative) further comprised 0.1 wt. % or 0.2 wt. % of $Cu(NO_3)_2$, $Co(NO_3)_2$, or $Fe(NO_3)_3$, respectively. The substrate removal rates (RR) were determined for each of the polishing compositions. The results are summarized in Table 1.

TABLE 1

| Polishing Composition | Oxidizer | pH | RR (Å/min) |
| --- | --- | --- | --- |
| 1A (invention) | 0.1 wt. % $AgNO_3$ | 2.5 | 1633 |
|  | 0.2 wt. % $AgNO_3$ | 2.7 | 1528 |
| 1B (comparative) | 0.1 wt. % $Cu(NO_3)_2$ | 2.7 | 388 |
|  | 0.2 wt. % $Cu(NO_3)_2$ | 2.6 | 1118 |
| 1C (comparative) | 0.1 wt. % $Co(NO_3)_2$ | 2.3 | 297 |
| 1D (comparative) | 0.1 wt. % $Fe(NO_3)_3$ | 2.5 | 508 |
|  | 0.2 wt. % $Fe(NO_3)_3$ | 2.5 | 437 |

The results in Table 1 illustrate that the use of silver salts as oxidizers produces an increase in polishing removal rates relative to other types of transition metal oxidants.

EXAMPLE 2

This example demonstrates that increasing the amount of the silver salt increases the substrate removal rate.

Similar memory disk substrates comprising nickel phosphorus were polished with different polishing compositions (Polishing Compositions 2A–2P). Each polishing composition contained 0.4 wt. % colloidal silica at a pH of approximately 2.5. Polishing Compositions 2A–2H (invention) further comprised 0.1 wt. %, 0.2 wt. %, 0.3 wt. %, 0.4 wt. %, 0.5 wt. %, 0.8 wt. %, 1.0 wt. %, and 1.5 wt. % $AgNO_3$, respectively. Polishing Compositions 2I–2P (invention) further comprised 0.5 wt. % potassium monopersulfate (Oxone® oxidizing agent, DuPont) and 0.1 wt. %, 0.2 wt. %, 0.3 wt. %, 0.4 wt. %, 0.5 wt. %, 0.6 wt. %, 0.7 wt. %, and 0.8 wt. % $AgNO_3$, respectively. The removal rates (RR) were determined for each of the polishing compositions. The polishing results are summarized in Table 2 and FIG. 1.

TABLE 2

| Polishing Composition | $AgNO_3$ | Secondary Oxidizer | RR (Å/min) |
| --- | --- | --- | --- |
| 2A | 0.1 wt. % | none | 463 |
| 2B | 0.2 wt. % | none | 1652 |
| 2C | 0.3 wt. % | none | 2168 |
| 2D | 0.4 wt. % | none | 2450 |
| 2E | 0.5 wt. % | none | 2759 |
| 2F | 0.8 wt. % | none | 3180 |
| 2G | 1.0 wt. % | none | 3512 |
| 2H | 1.5 wt. % | none | 3542 |
| 2I | 0.1 wt. % | Oxone ® | 1313 |
| 2J | 0.2 wt. % | Oxone ® | 2131 |
| 2K | 0.3 wt. % | Oxone ® | 2431 |
| 2L | 0.4 wt. % | Oxone ® | 2759 |
| 2M | 0.5 wt. % | Oxone ® | 2984 |
| 2N | 0.6 wt. % | Oxone ® | 3406 |
| 2O | 0.7 wt. % | Oxone ® | 3572 |
| 2P | 0.8 wt. % | Oxone ® | 4080 |

The results shown in Table 2 illustrate that increasing the amount of the silver salt increases the substrate removal rates and show that the addition of a secondary oxidizing agent can further improve the substrate removal rate.

EXAMPLE 3

This example demonstrates the effect of a secondary oxidizer on the removal rate of a memory disk substrate.

Similar memory disk substrates comprising nickel phosphorus were polished with different polishing compositions (Polishing Compositions 3A–3D). Each polishing composition contained 4 wt. % colloidal silica and 0.5 wt. % $AgNO_3$ at a pH of 2.5. Polishing Compositions 3A–3D (invention) further comprised 0.05 wt. %, 0.1 wt. %, 0.2 wt. %, and 0.3 wt. % potassium monopersulfate (Oxoneg oxidizing agent, DuPont). The removal rates (RR) for the substrate were determined for each of the polishing compositions. The results are summarized in Table 3.

TABLE 3

| Polishing Composition | Amount Oxone ® Oxidizing Agent | RR (Å/min) |
|---|---|---|
| 3A | 0.05 wt. % | 2845 |
| 3B | 0.1 wt. % | 2906 |
| 3C | 0.2 wt. % | 2962 |
| 3D | 0.3 wt. % | 3060 |

The results show that increasing the amount of the secondary oxidizing agent produces relatively small increases in the substrate removal rate.

EXAMPLE 4

This example demonstrates the effect of different secondary oxidizing agents on the removal rates for polishing compositions containing silver nitrate.

Similar substrates comprising nickel phosphorus were polished with different polishing compositions (Polishing Compositions 4A–4D). Each of Polishing Compositions 4A–4C (invention) comprised 4 wt. % colloidal silica and 0.5 wt. % $AgNO_3$. Polishing Compositions 4A and 4B (invention) also contained 0.5 wt. % potassium monopersulfate (Oxone® oxidizing agent, DuPont) and hydrogen peroxide, respectively, as a secondary oxidizing agent. Polishing Composition 4C (invention) did not contain a secondary oxidizing agent. Polishing Composition 4D (control) contained 4 wt. % colloidal silica and 0.5 wt. % potassium monopersulfate (Oxone® oxidizing agent, DuPont), without any $AgNO_3$. The removal rates (RR) of the substrate were determined for each of the polishing compositions. The results are summarized in Table 4.

TABLE 4

| Polishing Composition | Silver Salt | Secondary Oxidizing Agent | RR (Å/min) |
|---|---|---|---|
| 4A (invention) | $AgNO_3$ | Oxone ® | 2984 |
| 4B (invention) | $AgNO_3$ | $H_2O_2$ | 2872 |
| 4C (invention) | $AgNO_3$ | none | 2759 |
| 4D (control) | None | Oxone ® | 1208 |

These results show that the combination of a silver salt with a secondary oxidizing agent produces only a small increase in the substrate removal rate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of polishing a nickel-containing substrate comprising:
   (i) contacting the substrate with a chemical-mechanical polishing system comprising:
      (a) an abrasive, a polishing pad, or both an abrasive and a polishing pad,
      (b) a silver salt comprising a silver ion,
      (c) a secondary oxidizing agent, and
      (d) a liquid carrier, and
   (ii) abrading at least a portion of the substrate to polish the substrate,
   wherein the amount of the silver ion is about 0.1 wt. % to about 3 wt. % and the wt. % amount of the secondary oxidizing agent is about 3 or less times the wt. % amount of the silver salt, based on the weight of the liquid carrier and anything dissolved or suspended therein.

2. The method of claim 1, wherein the silver salt is selected from the group consisting of silver halides, silver sulfate, silver nitrate, silver carbonate, silver acetate, silver perchlorate, silver dichromate, silver oxide, and combinations thereof.

3. The method of claim 2, wherein the silver salt is silver nitrate.

4. The method of claim 1, wherein the secondary oxidizing agent is a peroxide, a monopersulfate, a perborate, or a persulfate.

5. The method of claim 1, wherein the system comprises an abrasive, and the abrasive is suspended in the liquid carrier.

6. The method of claim 5, wherein the abrasive is selected from the group consisting of alumina, silica, ceria, germania, titania, silicon nitride, silicon carbide, diamond, polymer particles, co-formed particles, coated particles, and combinations thereof.

7. The method of claim 6, wherein the abrasive is silica.

8. The method of claim 1, wherein the system has a pH of about 5 or less.

9. The polishing system of claim 1, wherein the system comprises an abrasive, and the abrasive is fixed on a polishing pad.

10. The method of claim 1, wherein the nickel-containing substrate is a memory disk.

11. A chemical-mechanical polishing system comprising:
   (a) an abrasive, a polishing pad, or both an abrasive and a polishing pad,
   (b) a liquid carrier,
   (c) a silver salt comprising a silver ion, and
   (d) a secondary oxidizing agent,
wherein the amount of the silver ion is about 0.1 wt. % to about 3 wt. % and the wt. % amount of the secondary oxidizing agent is about 3 or less times the wt. % amount of the silver salt, based on the weight of the liquid carrier and anything dissolved or suspended therein.

12. The chemical-mechanical polishing system of claim 11, wherein the silver salt is selected from the group consisting of silver halides, silver sulfate, silver nitrate, silver carbonate, silver acetate, silver perchlorate, silver dichromate, silver oxide, and combinations thereof.

13. The chemical-mechanical polishing system of claim 12, wherein the silver salt is silver nitrate.

14. The chemical-mechanical polishing system of claim 11, wherein the secondary oxidizing agent is a peroxide, a monopersulfate, a perborate, or a persulfate.

15. The chemical-mechanical polishing system of claim 11, wherein the abrasive is selected from the group consisting of alumina, silica, ceria, germania, titania, silicon nitride, silicon carbide, diamond, polymer particles, co-formed particles, coated particles, and combinations thereof.

16. The chemical-mechanical polishing system of claim 11, wherein the abrasive is silica.

17. The chemical-mechanical polishing system of claim 11, wherein the system comprises an abrasive, and the abrasive is suspended in the liquid carrier.

18. The chemical-mechanical polishing system of claim 11, wherein the system comprises an abrasive, and the abrasive is fixed on a polishing pad.

19. The chemical-mechanical polishing system of claim 11, wherein the system has a pH of about 5 or less.

20. A method of polishing a nickel-containing substrate comprising:
   (i) contacting the substrate with a chemical-mechanical polishing system comprising:
      (a) an abrasive, a polishing pad, or both an abrasive and a polishing pad,
      (b) a silver salt comprising a silver ion, and
      (c) a liquid carrier, and
   (ii) abrading at least a portion of the substrate to polish the substrate, wherein the polishing system does not contain a substantial amount of a secondary oxidizing agent.

21. The method of claim 20, wherein the silver salt is selected from the group consisting of silver halides, silver sulfate, silver nitrate, silver carbonate, silver acetate, silver perchlorate, silver dichromate, silver oxide, and combinations thereof.

22. The method of claim 21, wherein the silver salt is silver nitrate.

23. The method of claim 20, wherein the system comprises an abrasive, and the abrasive is suspended in the liquid carrier.

24. The method of claim 23, wherein the abrasive is selected from the group consisting of alumina, silica, ceria, germania, titania, silicon nitride, silicon carbide, diamond, polymer particles, co-formed particles, coated particles, and combinations thereof.

25. The method of claim 24, wherein the abrasive is silica.

26. The method of claim 20, wherein the system has a pH of about 5 or less.

27. The polishing system of claim 20, wherein the system comprises an abrasive, and the abrasive is fixed on a polishing pad.

28. The method of claim 23, wherein the nickel-containing substrate is a memory disk.

\* \* \* \* \*